(12) United States Patent
Chung

(10) Patent No.: US 6,909,259 B2
(45) Date of Patent: Jun. 21, 2005

(54) BATTERY CHARGER WITH POWER CORD REEL

(76) Inventor: Yu-Lin Chung, No 4, Lane 130, Nan-Kang Rd, Sec. 3, Taipei (TW)

( * ) Notice: Subject to any disclaimer, the term of this patent is extended or adjusted under 35 U.S.C. 154(b) by 44 days.

(21) Appl. No.: 10/653,060

(22) Filed: Sep. 3, 2003

(65) Prior Publication Data
US 2005/0046385 A1 Mar. 3, 2005

(51) Int. Cl.⁷ .................................................. H02J 7/00
(52) U.S. Cl. ..................... 320/107; 242/381.6; 242/377
(58) Field of Search ........................ 320/113–115, 107, 320/110, 111; 33/767, 740; 242/381.6, 377; 191/12 R, 12.2 R, 14

(56) References Cited

U.S. PATENT DOCUMENTS

| | | | | | |
|---|---|---|---|---|---|
| 3,773,987 A | * | 11/1973 | Davis et al. | ................ | 191/12.4 |
| 5,279,473 A | * | 1/1994 | Rozon | ........................ | 242/377 |
| 5,332,171 A | * | 7/1994 | Steff | ........................... | 242/378 |
| 5,448,837 A | * | 9/1995 | Han-Teng | ..................... | 33/761 |
| 5,923,146 A | * | 7/1999 | Martensson | ................. | 320/111 |
| 5,923,147 A | * | 7/1999 | Martensson | ................. | 320/111 |
| 6,397,991 B1 | * | 6/2002 | Chang | ....................... | 191/12.4 |
| 6,495,988 B1 | * | 12/2002 | Liao | ............................ | 320/111 |

* cited by examiner

Primary Examiner—Michael Sherry
Assistant Examiner—Robert Grant
(74) Attorney, Agent, or Firm—Bacon & Thomas PLLC

(57) ABSTRACT

A battery charger supporting 3C (computer, communication, consumer electronics) products such as a mobile telephone, a PDA, a notebook computer, a digital camera, a digital video camera, etc. The battery charger is constructed to include a body, a circuit board, a reel assembly, an outlet lead wire, a rotable reel, a securing axle, a slide switch, and a two-pinned plug. Apart from a terminal at one end of the retractable outlet lead wire being adapted to enable connecting to a jack of a mobile phone and thereby charge the mobile phone, the battery charger is also configured with a battery recess that supports inserting of a mobile phone battery therein, whereby charging of the mobile phone battery can be accomplished.

1 Claim, 3 Drawing Sheets

BATTERY CHARGER WITH POWER CORD REEL

BACKGROUND OF THE INVENTION (a) Field of the Invention

The present invention relates to a battery charger supporting 3C (computer, communication, consumer electronics) products such as a mobile telephone, etc., and more particularly to a terminal at one end of a retractable outlet lead wire being adapted to connect to 3C products such as a mobile phone, etc. whereby charging of the mobile phone battery can be accomplished.

(b) Description of the Prior Art

Referring to FIG. 1, which shows a conventional battery charger for a mobile phone comprising a body 100, and two terminals 300 configured on a bottom end of a battery recess 200 defined in a front side of the body 100. The terminals 300 are configured to come in contact with terminals at a bottom end of a mobile phone battery upon the mobile phone battery being inserted into the battery recess 200. A two-pinned plug 400 is provided on the reverse side of the body 100 for connecting to an AC power supply wall outlet. Furthermore, a terminal of a conventional battery charger is adapted to plug directly into a jack provided at a bottom end of a mobile phone, thereby allowing direct charging of the mobile phone battery. The present inventor has also invented a Power Adapter disclosed in U.S. Pat. No. 6,325,66B1. This power adapter is capable of completely retracting a cable into the interior of the power adapter body.

However, the two aforementioned battery chargers include only a single function, and present market conditions do not supply a battery charger that provides functionality to concurrently charge both a mobile phone battery and mobile phone itself at the same time.

SUMMARY OF THE INVENTION

A main objective of the present invention is to provide a battery charger having a retractable outlet lead wire and a battery recess that supports inserting of a mobile phone battery therein, and including functionality to concurrently charge 3C (computer, communication, consumer electronics) products such as a mobile phone, etc. and a battery at the same time.

To enable a further understanding of the objectives and technological methods of the invention herein, the brief description of the drawings below is followed by the detailed description of the preferred embodiments.

DETAILED DESCRIPTION OF THE PREFERRED EMBODIMENTS

Figure 1:
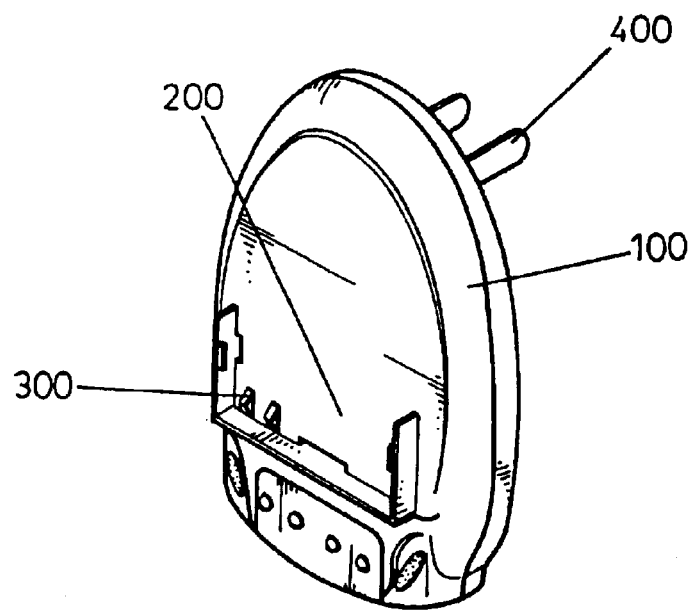
FIG. 1 shows a schematic view of a conventional battery charger.
Figure 2:
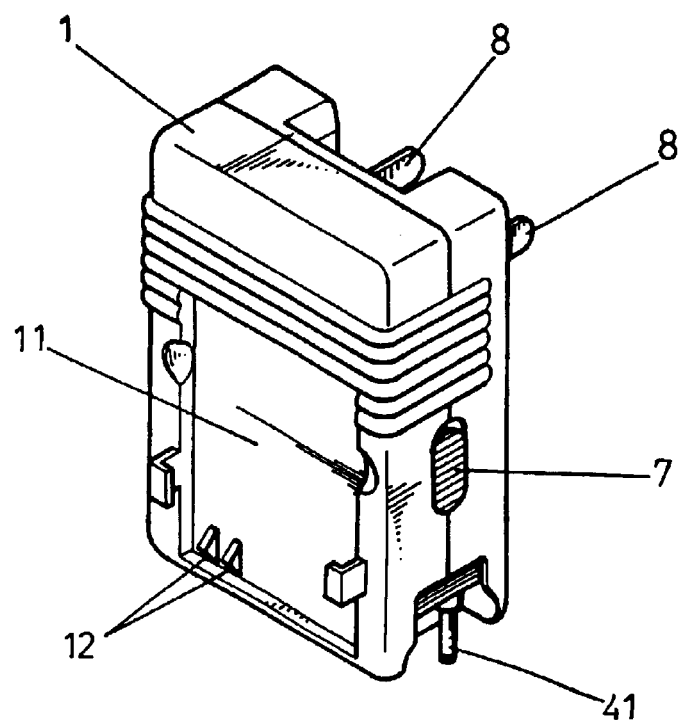
FIG. 2 shows a schematic view according to the present invention.
Figure 3:
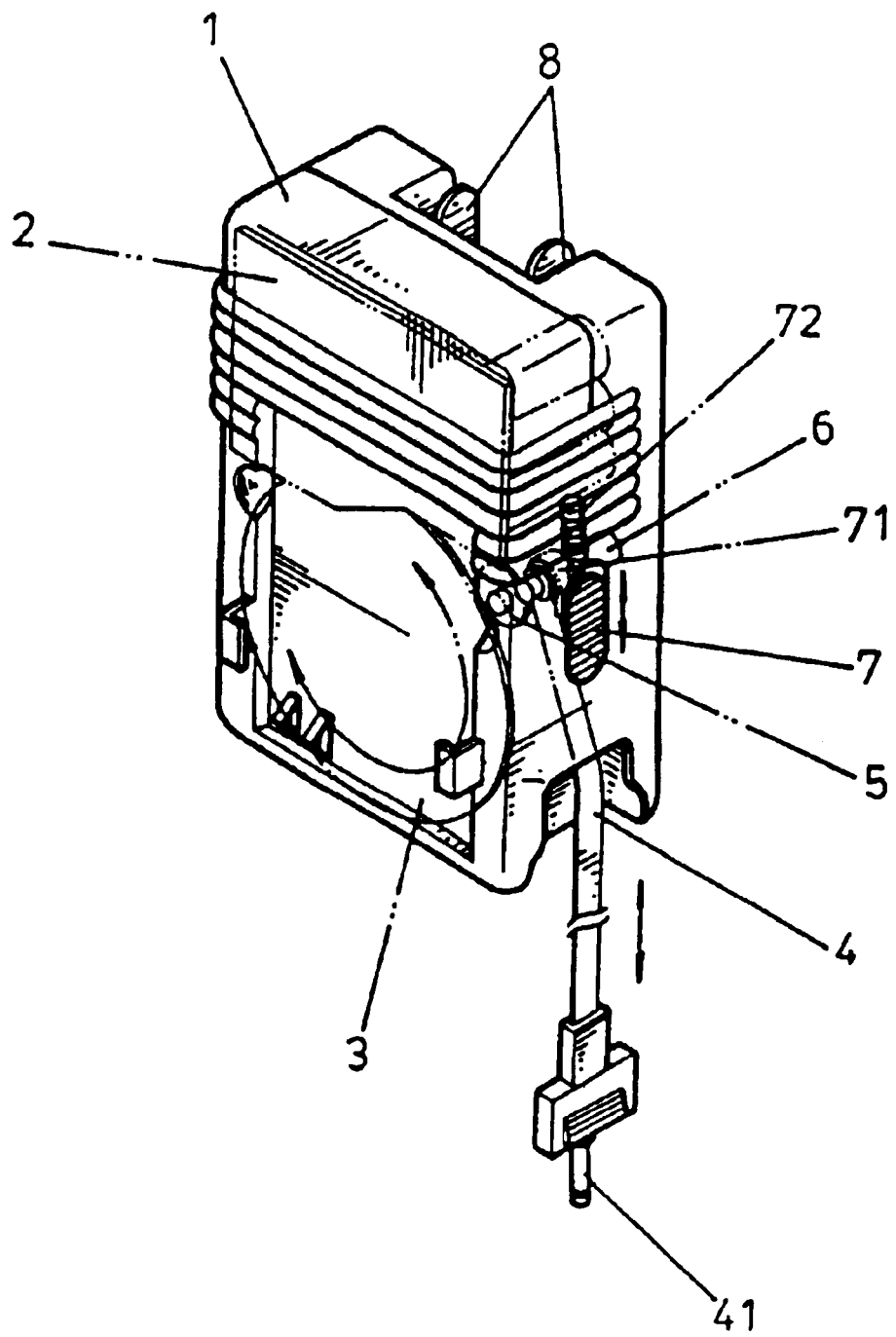
FIG. 3 shows a preferred embodiment according to the present invention.
Figure 4:
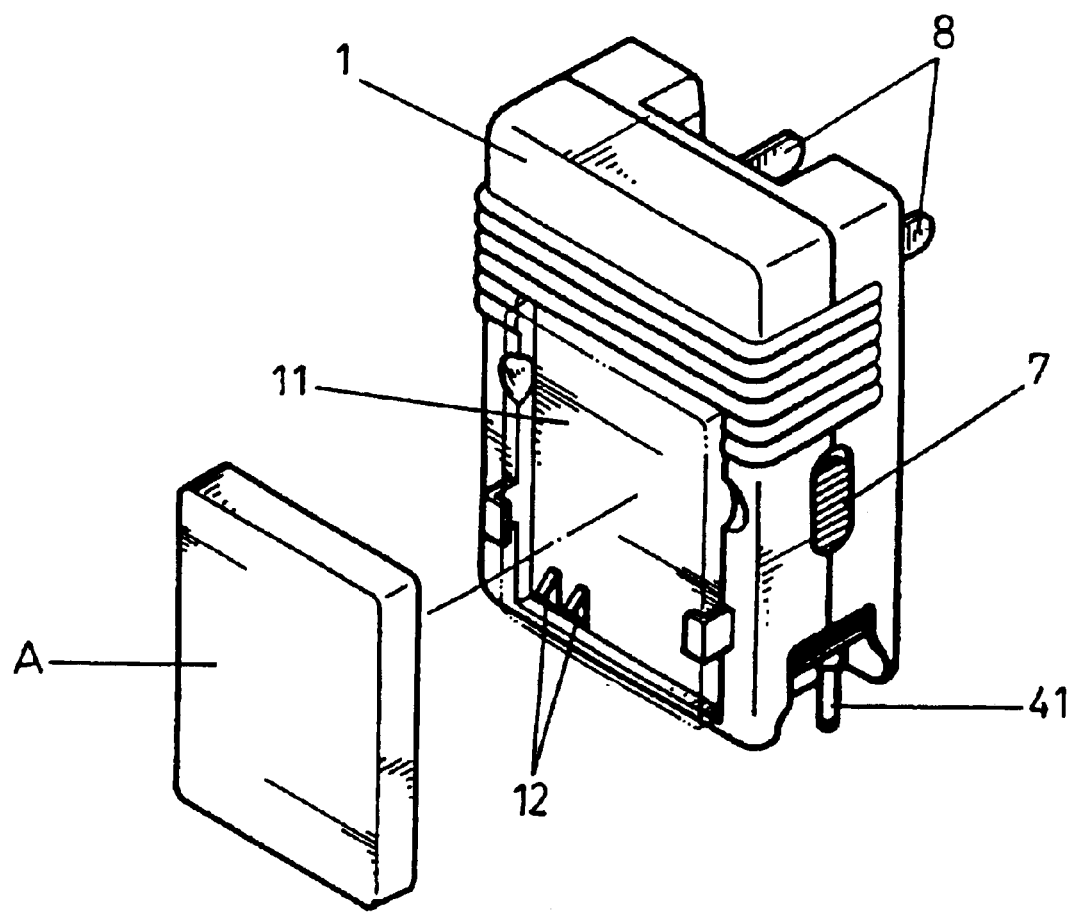
FIG. 4 shows a reference drawing of an applied example according to the present invention.

With reference to the drawings, and in particular to FIGS. 2 and 3 which show the present invention constructed to include a body 1, a circuit board 2, a reel assembly 3, an outlet lead wire 4, a rotatable reel 5, a securing axle 6, a slide switch 7, and a two-pinned plug 8. The circuit board 2 and the reel assembly 3 are configured within the body 1 (assembled from an upper portion and a lower portion). A button spring is defined within the reel assembly 3, and configured to enable retracting of the outlet lead wire 4. The rotatable reel 5 is configured topmost of the reel assembly 3, and the securing axle 6 is configured on top of the rotable reel 5. The outlet lead wire 43 is thus able to be threaded between the rotatable reel 5 and the securing axle 6. A terminal 41 at one end of the outlet lead wire 4 is adapted for direct connection into a jack at a bottom end of a mobile phone. The slide switch 7 is on a side of the body 1, and an arc-shaped catch 71 defined on an inner edge of the slide switch 7 facilitates catching hold of the outlet lead wire 4. The catch 71 engages with a spring 72, and utilizes resilience of the spring 72 to allow catch 71 to maintain a constant catch hold on the outlet lead wire 4. Upon pushing the slide switch 7 upwards and compressing spring 72, the reel assembly 3 is thereby enabled to immediately retract the outlet lead wire 4 extended outside. Upon release of exerting a push on the slide switch 7, a restoring spring force of the spring 72 returns the catch 71 to a state of catching hold of the retractable outlet lead wire 4 and thereupon holding a position on the outlet lead wire 4. A two-pinned plug 8 configured on the reverse side of the body 1 is adapted to engage with the circuit board 2. The plug 8 enables facilitating plugging into an AC power supply wall socket. Main characteristics of the present invention include:

A battery recess 11 defined in a front side of the body 1 (see FIG. 4), the battery recess supports inserting of a mobile phone battery A therein. Two terminals 12 at the bottom end of the battery recess 11 engage with the circuit board 2, and the terminals 12 are configured to come in contact with terminals of the mobile phone battery A, allowing charging of the battery.

In conclusion, the present invention incorporates a terminal at one end of a retractable outlet lead wire adapted to directly connect to a jack of a mobile phone, and facilitating charging of the mobile phone. The battery recess 11 is defined in the body of the present invention, and supports insertion of a mobile phone battery therein and charging of the battery.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A battery charger comprising:

a body;

a circuit board within the body;

a reel assembly within the body;

an outlet lead wire retractable within the reel assembly or extendable outside the body, a terminal at an end of the outlet lead wire for connection directly into a jack of a mobile phone;

a rotatable reel positioned at a side of the reel assembly;

a securing axle positioned at a side of the rotatable reel to facilitate threading of the outlet lead wire through a gap defined between the rotatable reel axle and the securing axle;

a slide switch positioned at a side of the body, a catch provided on an inner edge of the slide switch for catching hold of the outlet lead wire, one end of the catch being engaged with a spring;

a two-pinned plug positioned at one end of the body for engaging the circuit board within the body of the battery charger;

a battery recess defined in one end of the body for receiving a mobile phone battery therein, and two terminals within the battery recess engaging with the circuit board for contacting with terminals of a battery and charging the battery.

* * * * *